United States Patent [19]

Buell

[11] 4,218,889
[45] Aug. 26, 1980

[54] MASS TRANSIT SYSTEMS

[76] Inventor: Erik F. Buell, Box 418, R.D. #2, Gibsonia, Pa. 15044

[21] Appl. No.: 10,037

[22] Filed: Feb. 7, 1979

[51] Int. Cl.³ .......................... F01K 13/00; F24J 3/02; B60K 1/00
[52] U.S. Cl. ....................................... 60/676; 60/721; 126/433; 126/437; 126/440; 180/2 A; 180/54 C; 180/165
[58] Field of Search ................... 180/54 C, 54 F, 165, 180/2 A, 310; 60/698, 676, 670, 721; 126/433, 437, 440, 450

[56]  References Cited

U.S. PATENT DOCUMENTS

| | | | |
|---|---|---|---|
| 2,920,710 | 1/1960 | Howard | 126/424 |
| 3,734,222 | 5/1973 | Bardwick | 180/165 |
| 3,749,194 | 7/1973 | Bardwick | 180/165 |
| 3,886,810 | 6/1975 | Sugiyama | 180/165 |
| 3,923,115 | 12/1975 | Helling | 180/165 |
| 4,069,674 | 1/1978 | Warren | 60/676 |
| 4,090,577 | 5/1978 | Moore | 180/54 C |
| 4,098,144 | 7/1978 | Besel et al. | 180/165 |
| 4,126,200 | 11/1978 | Miller | 180/165 |
| 4,148,192 | 4/1979 | Cummings | 180/54 C |
| 4,167,856 | 9/1979 | Seidel et al. | 60/676 |

Primary Examiner—James C. Yeung
Assistant Examiner—Daniel O'Connor
Attorney, Agent, or Firm—Buell, Blenko & Ziesenheim

[57] ABSTRACT

A mass transit system is provided which derives its basic energy from the solar system and recovered heat energy. The system of the invention provides a storage building having a roof and an internal storage area for a multiplicity of individual wheel vehicles, a solar energy collection system on the roof of said building, water storage means in said building, a circulating system circulating water from said water storage means through said solar energy collection system for heating said water and storing said heat as heated water in said water storage means, energy conversion means in said building converting said heat in said water storage means to rotary energy, a plurality of wheeled vehicles, energy storage means in each said wheeled vehicle, means connecting said energy conversion means selectively to the energy storage means of each said wheeled vehicle for transferring and storing energy from the water storage means to the energy storage means in said wheeled vehicles, energy transmission means in each wheeled vehicle selectively connecting said energy storage means to drive wheels on said vehicle for driving the same, a braking system in each wheeled vehicle acting selectively to stop said drive wheels, a heat collection system surrounding said brakes for collecting frictional heat resulting from braking said vehicle, a vehicle solar heat collection on each said vehicle, fluid energy transfer means receiving the heat from the friction heat collection system and from said solar heat collection system on the vehicle, a drive means selectively connected to said energy storage means for adding driving energy thereto, said drive means connected to said fluid energy transfer means and energized thereby.

9 Claims, 5 Drawing Figures

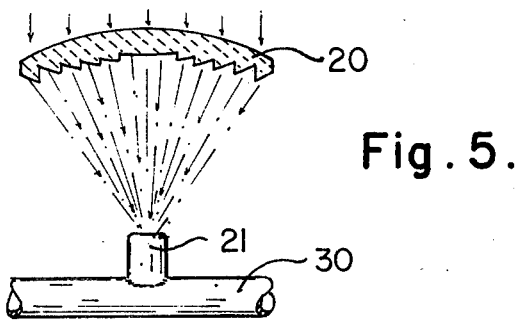
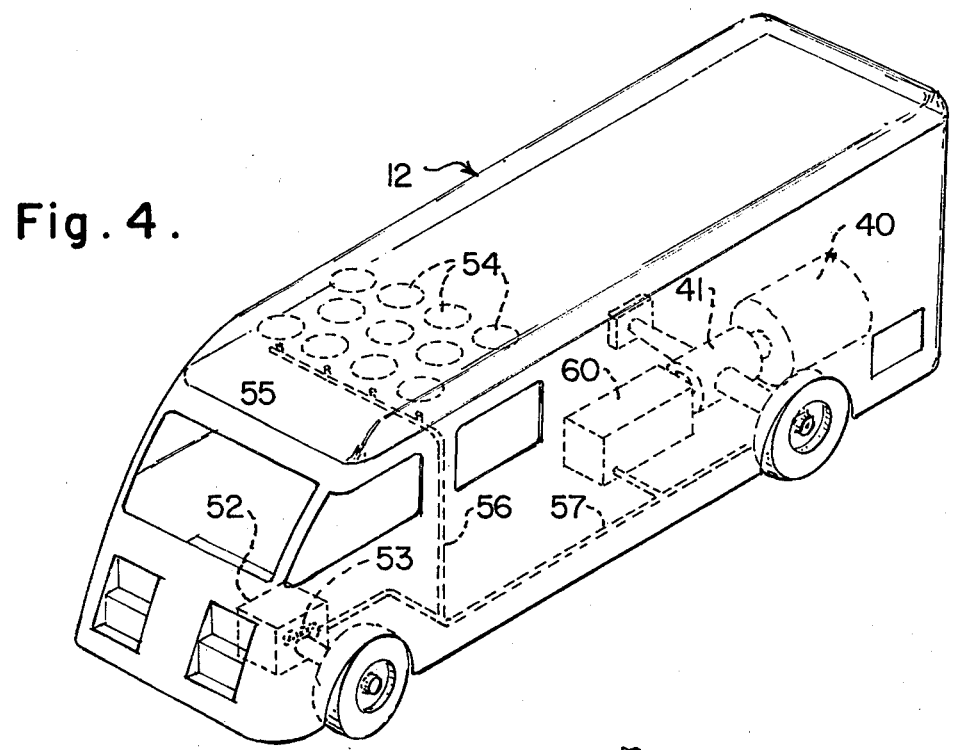
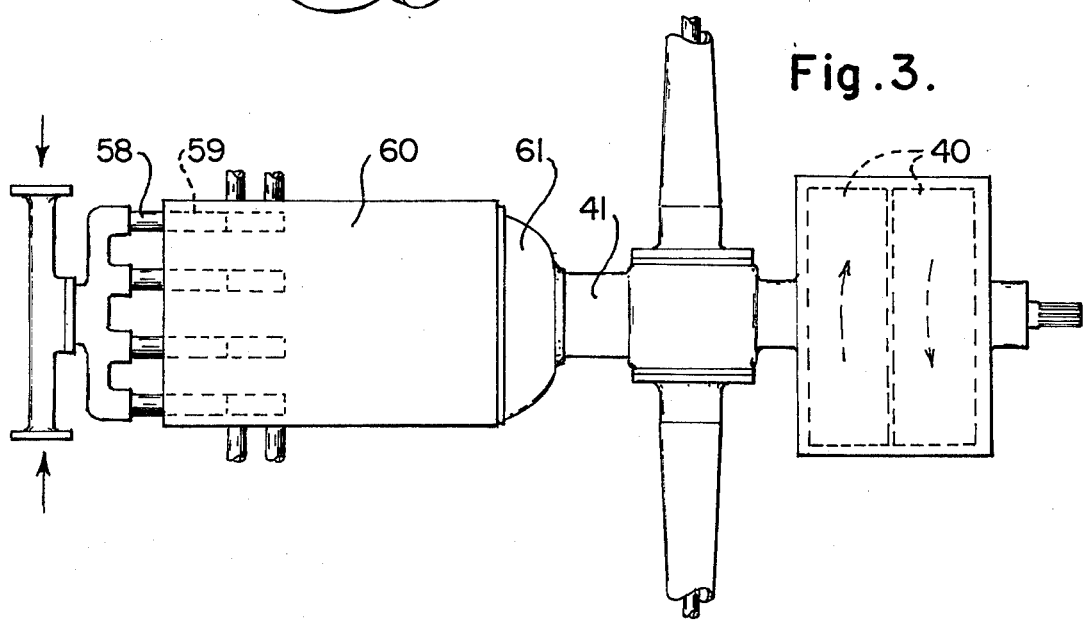

MASS TRANSIT SYSTEMS

This invention relates to mass transit systems and particularly to a mass transit system which derives its power from solar energy and recovered heat energy.

It is a recognized fact that the most efficient method of transporting people, particularly in urban areas, is by means of mass transit systems. It is equally well recognized that the cost of fossil fuels is increasing and their availability is decreasing so that all forms of transportation are subject to an ever increasing cost squeeze with no likelihood of any relief.

I have developed a mass transit system which derives its power from solar energy and recovered heat energy. My invention is based upon storing heat from the solar system in a heat reservoir and using the stored heat to operate a continuously rotating flywheel in conjunction with heat recovered from braking and solar energy on the vehicle to operate a Stirling engine to rotate the flywheel which is used as the motive power for a motor bus transit system.

I provide a storage building or garage having a roof and an internal storage area for a multiplicity of individual wheeled vehicles, a solar energy collection system on the roof of said building, water storage means in said building, a circulating system, circulating water from said water storage means through said solar energy collection system for heating said water and storing said heat in said storage means, energy conversion means in said building converting the heat in said water storage means to rotary energy, a plurality of wheeled vehicles, energy storage means in each said wheeled vehicle, means connecting said energy conversion means selectively to the energy storage means of said wheeled vehicles for transferrring and storing energy from the water storage means to the energy storage means in said vehicles, energy transmission means in each wheeled vehicle selectively connecting said energy storage means to the wheels of said vehicle for driving the same, a braking system in each wheeled vehicle acting selectively to stop said wheels, a friction heat collection system surrounding said brakes for collecting heat resulting from braking said vehicle, a vehicle solar heat collection system on the roof of said vehicle, fluid energy transfer means receiving the heat from said friction heat collection system and said vehicle solar heat collection system, and drive means selectively connected to said energy storage means for adding driving energy thereto, said drive means connected to said fluid energy transfer means and energized thereby. Preferably the solar energy collection system is a group of reflectors and fresnel lenses collecting the heat energy from the solar system and directing it into the circulatory system of water from the water storage means. The energy conversion means is preferably a steam turbine receiving steam from the water storage means created by the heat picked up in the circulating water. The wheeled vehicles are preferable in the form of motor buses having a pair of flywheels as a first drive means which are energized by the steam turbine up to very high speed, e.g. 75,000 r.p.m. and which are selectively connected to the drive wheels through a variable ratio transmission operated by a throttle. The second drive means on the wheeled vehicles is preferably a Philips-Stirling heat engine driven by the heat from the regenerative braking system and the solar collection system on the vehicle itself. The engine is connected to the flywheel pair by a one-way or overriding clutch mechanism which transmits power from the engine to the flywheel but not in the opposite direction. The engine is self-starting and of well known form. Its power is fed directly into the flywheel and is in no way affected by any of the transmission system. Such a system is essentially pollution free, economical and extremely conservative of energy.

I estimate the run-down time on a properly constructed flywheel at about 200 days, thus negating the necessity of reclaiming energy at night. However, I provide a flywheel braking system which will reclaim the flywheel energy when a vehicle needs service work. This heat reclaiming system includes a heat exchange unit and flywheel brake system similar to that used on the brakes of the vehicles themselves to recover the energy resulting from slowing down and stopping the flywheels. I also provide an auxiliary heat system in the event of a long period of low solar energy.

In the foregoing general description of my invention I have described certain objects, purposes and advantages of my invention. Other objects, purposes and advantages of my invention will be apparent from a consideration of the following description and the accompanying drawings in which:

FIG. 3 is a plan view of the drive system for each individual vehicle;

FIG. 4 is an isometric view partly cut away showing a vehicle of this invention; and FIG. 5 is a fragmentary view partly in section of a portion of the heat collection system.

Figure 1:
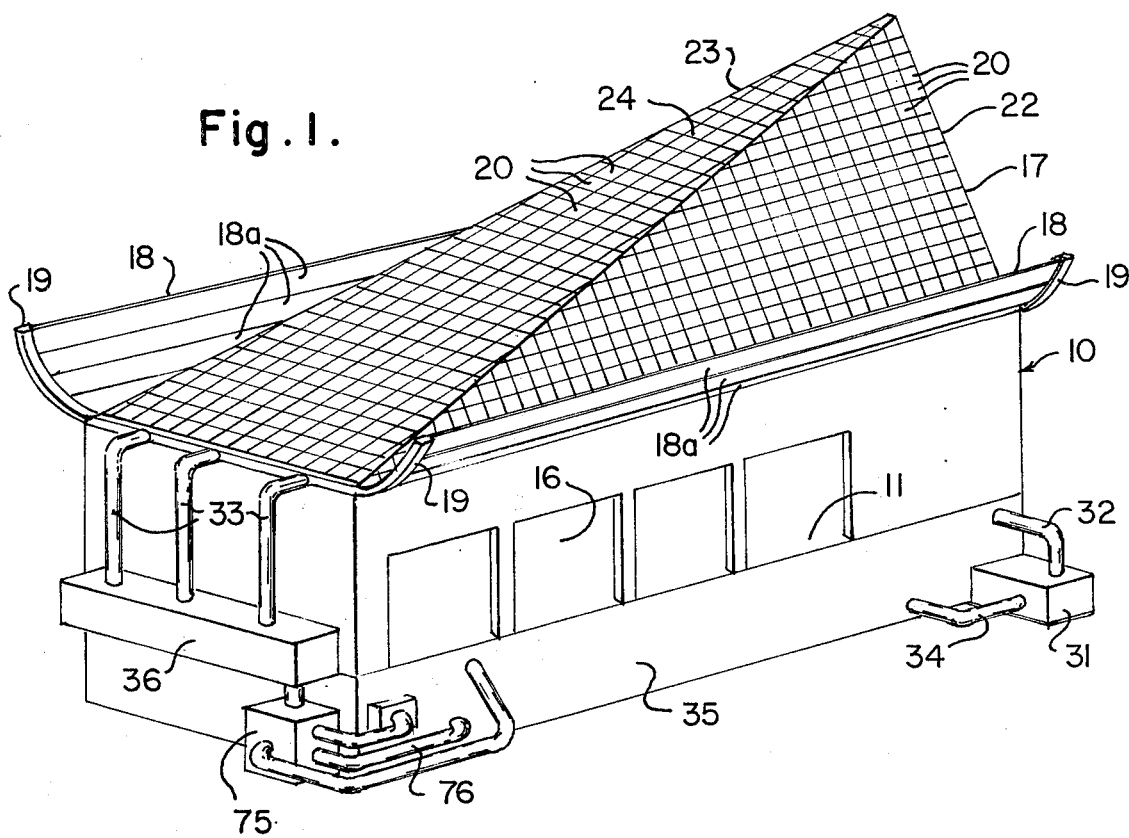
FIG. 1 is an isometric view of a storage building according to my invention.
Figure 2:
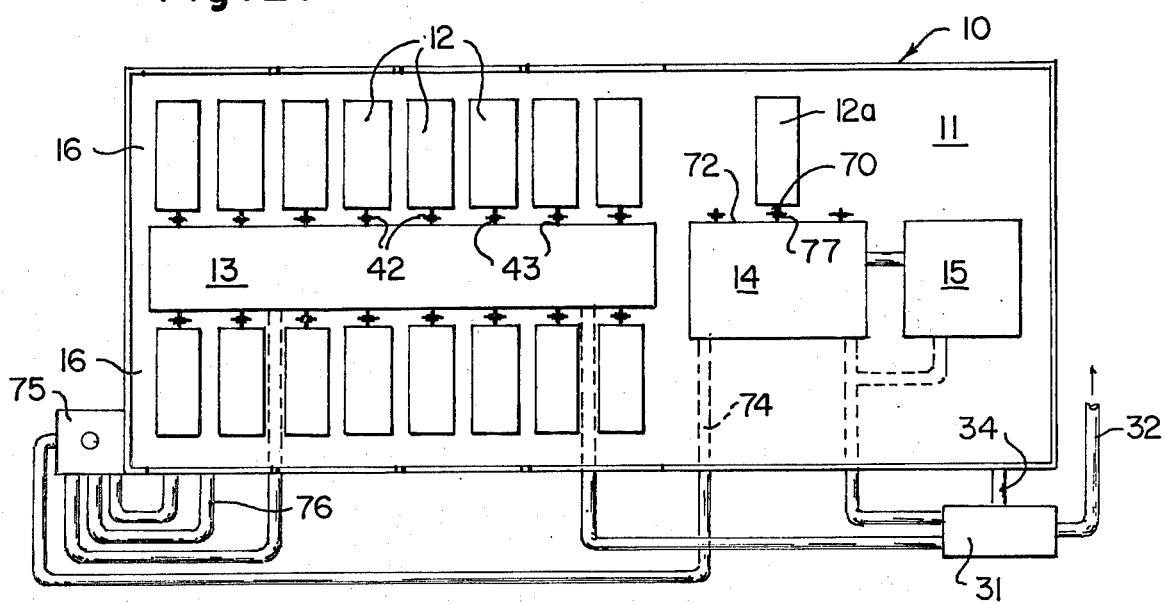
FIG. 2 is a top plan view of the bus storage and regeneration area of the storage building of FIG. 1.

Referring to the drawings, I have illustrated a garage or storage building 10 having a generally rectangular main floor 11 for storage and regeneration of buses 12. Such a garage might be, for example, 90 feet × 150 feet containing a steam turbine 13, a flywheel brake and heat recovery system 14 and an auxiliary heat supply 15 such as a gas or oil water heating unit. On each side of the turbine 13 are provided parking spaces 16 for the buses 12. Beneath the first floor is a pressurized tank 35 holding water, for example 10,000 gallons at 300° F., which provides steam for running the turbine.

The roof 17 of the building is tilted to receive the sun's rays and carries reflectors 18 that extend out and upward on rails 19 to focus extra solar energy onto the roof. The roof 17 is covered with fresnel lenses 20 focused onto the ends of heat pipes 21 (FIG. 5). The reflectors 18 are made up of a plurality of elongate panels 18a hinged at their edges and moving in rails 19 in much the same manner as a garage door. The roof 17 is in the form of two right triangles 22 and 23 which in the example would measure 150 feet by 90 feet on the two right sides and be tipped at an angle of 30°. The central panel 24 is an isosceles triangle with sides approximating 175 feet long. This totals approximately 19,000 square feet of roof collector areas, which coupled with the added energy derived from the reflector panels provides a possibility of collecting approximately 9,500,000 BTU of energy in the form of heat. Each bus requires approximately 500,000 BTU of energy per day and thus the system yields sufficient energy for 15 buses plus auxiliary energy for other garage services.

As pointed out above the energy collection system is based upon the use of fresnel lenses 20 focused on the ends of heat tubes or pipes 21 as shown in FIG. 5. The heat pipes 21 are connected to a manifold 30 and thence to a circulating system made up of a pump 31, delivery pipe 32 and return heat pipes 33. Pump 31 takes water from storage tank 35 through pipe 34 and return pipes 33 return the high temperature heated water to tank 35 through a thermal control box 36. The thermal control box 36 contains three heat sensitive relays (not shown) which control valves in return pipes 33, one from each of the roof surfaces 22, 23 and 24. Valves are opened or closed to control the flow of water through each surface so that the flow of water through any area which is not receiving sufficient energy to raise the water to a pre-fixed temperature will be restricted or stopped until the position of the sun changes so that heat is received in that area.

Each bus 12 is provided with a pair of 350 pound flywheels 40 which counterrotate in order to cancel the torque effects of their rotation on the chassis. These flywheels 40 are preferably constructed of layered fused-silica fibers. Their high speed rotation is converted into usable forward motion by a variable ratio transmission 41, operated by a throttle (not shown). This variable ratio transmission 41 could be any of the well known types such as a variable pulley arrangement.

The flywheels 40 are energized by connecting them to the turbine during the night to bring them up to their maximum speed. They are connected by backing the bus 12 into position to be connected to a drive clutch 42 at each stall, which clutch is connected to a drive shaft 43 driven by turbine 13 by means of appropriate gearing.

Each bus 12 is provided with a regenerative braking system and a panel of roof mounted solar heat collectors. The braking system uses standard disc type brakes, inboard of the wheels and working through half shafts on the front wheels. The two front discs and each of the rear discs are enclosed in boxes 52 containing a gas of high heat capacity such as Freon, which transfers the heat of braking to the finned ends of heat pipes 53. This heat and the heat from the fresnel lenses 54 directed to heat pipes 55, as in the case of the garage roof described above are delivered to the Stirling engine 60 by collector pipes 56 and 57 which connects to the hot ends 58 of regenerators 59 in a Philips-Stirling 100 h.p. heat engine 60. The Stirling engine 60 is connected to the flywheels 40 through a one way clutch 61. The energy delivered to the Stirling engine is thus in turn delivered to the flywheels as regenerating energy and, depending upon the solar input, will run up to 150,000 BTU per day. The result is a very quiet, efficient, pollution free bus.

In the event that the bus drive system requires maintenance with stopping of the flywheels 40, I provide a flywheel braking system which reclaims the energy remaining in the flywheels. In this system the bus 12a is backed into a stall in the garage area and the flywheels are connected to a brake shaft 70 having brake discs and pucks of usual type contained with a closed housing 72 filled with heat transfer gas which circulates around finned heat tubes connected to the heat storage tank by means of pipe 74 from pump 75 and delivery pipe 76 to storage tank 35. The flywheels are connected through one way clutch 77. In this way the major portion of energy in the flywheel is recovered prior to servicing and stored in the heated water in storage tank 35.

The water used in the heat collection system may contain an added salt to increase the heat carrying capacity of the water.

In the foregoing specification I have set out certain preferred embodiments and practices of my invention; however, it will be understood that this invention may be otherwise embodied within the scope of the following claims.

I claim:

1. A mass transit system comprising a storage building having a roof and an internal storage area for a multiplicity of individual wheel vehicles, a solar energy collection system on the roof of said building, water storage means in said building, a circulating system circulating water from said water storage means through said solar energy collection system for heating said water and storing said heat as heated water in said water storage means, energy conversion means in said building converting said heat in said water storage means to rotary energy, a plurality of wheeled vehicles, energy storage means in each said wheeled vehicle, means connecting said energy conversion means selectively to the energy storage means of each said wheeled vehicle for transferring and storing energy from the water storage means to the energy storage means in said wheeled vehicles, energy transmission means in each wheeled vehicle selectively connecting said energy storage means to drive wheels on said vehicle for driving the same, a braking system in each wheeled vehicle acting selectively to stop said drive wheels, a heat collection system surrounding said brakes for collecting frictional heat resulting from braking said vehicle, a vehicle solar heat collection system on each said vehicle, fluid energy transfer means receiving the heat from the friction heat collection system and from said solar heat collection system on the vehicle, a drive means selectively connected to said energy storage means for adding driving energy thereto, said drive means connected to said fluid energy transfer means and energized thereby.

2. A mass transit system as claimed in claim 1 wherein the solar energy collection system is a group of reflectors and fresnel lenses collecting the heat energy from the solar system and directing it into the circulatory system of water from the storage means.

3. A mass transit system as claimed in claim 1 wherein the energy conversion means is a steam turbine driven by steam created by the solar heating system.

4. A mass transit system as claimed in claim 1 wherein the wheeled vehicles are in the form of motor buses having a pair of counterrotating flywheels and means for connecting said flywheels to said energy conversion means.

5. A mass transit system as claimed in claim 4 wherein the flywheels are selectively connected to drive wheels on said motor buses by means of a variable ratio transmission.

6. A mass transit system as claimed in claim 1 wherein the drive means is a Stirling heat engine.

7. A mass transit system as claimed in claim 6 wherein the Stirling heat engine is connected to the energy storage means by means of a one-way clutch.

8. A mass transit system as claimed in claim 1 wherein the heat collection system surrounding said brakes comprises a sealed housing surounding the braking surfaces and a high heat capacity gas in said housing transferring heat from the brakes to an energy collection system.

9. A mass transit system as claimed in claim 1 wherein each wheeled vehicle carries a solar energy system in the form of fresnel lenses and heat pipes whereby said lenses direct heat onto said heat pipes.

* * * * *